No. 737,779. PATENTED SEPT. 1, 1903.
H. H. SCHENK.
TRACTION TRUCK.
APPLICATION FILED AUG. 1, 1902.
NO MODEL.

Witnesses
Henry H. Schenk, Inventor.
by C. A. Snow & Co.
Attorneys

No. 737,779. Patented September 1, 1903.

UNITED STATES PATENT OFFICE.

HENRY H. SCHENK, OF MEMPHIS, MISSOURI.

TRACTION-TRUCK.

SPECIFICATION forming part of Letters Patent No. 737,779, dated September 1, 1903.

Application filed August 1, 1902. Serial No. 117,933. (No model.)

*To all whom it may concern:*

Be it known that I, HENRY H. SCHENK, a citizen of the United States, residing at Memphis, Scotland county, State of Missouri, have invented a new and useful Traction-Truck, of which the following is a specification.

This invention relates to a traction-truck adapted for use on excavators, locomotives, traction-engines, and vehicles of all kinds used for hauling heavy loads over soft ground, and has for its object to provide a traction-truck having a large bearing or traction surface on the ground, thereby enabling heavy machinery to which it is applied to travel over soft ground without miring or without first laying tracks, as is now necessary on all heavy machines.

A further object of the invention is to provide a truck-frame having a rolling platform revolving thereon extending the entire width of the truck and composed of a plurality of pivoted links forming two or more continuous chains or link belts and provided with T-shaped overlapping surface irons, so that the platform will be flexible to an outward thrust to permit free movement around the actuating-wheels, but present a perfectly rigid surface to an inward thrust.

A further object is to provide means whereby the chain may be slackened to allow the surface irons and link-sections to be removed and repaired or replaced and also to regulate the tension thereof to take up any looseness or wear in the chain.

With these and other objects in view the invention consists in the construction and novel combination and arrangement of parts hereinafter fully described, illustrated in the accompanying drawings, and pointed out in the claims hereto appended.

Figure 1:
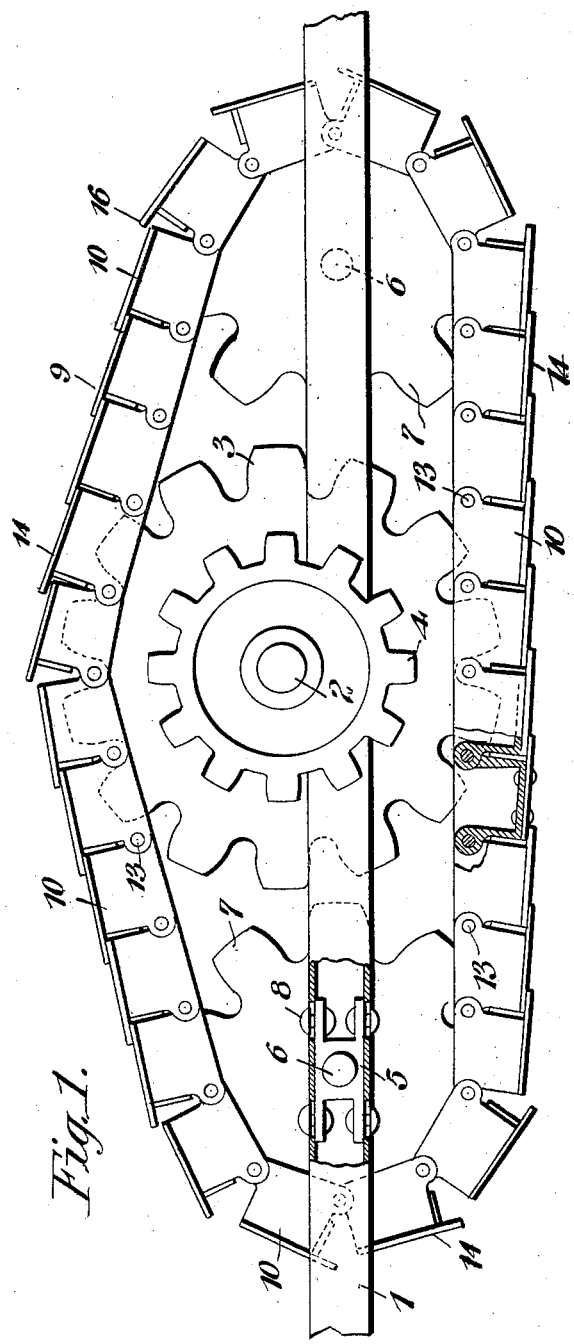
Figure 3:
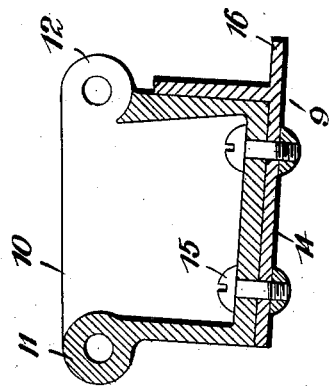
Figure 2:
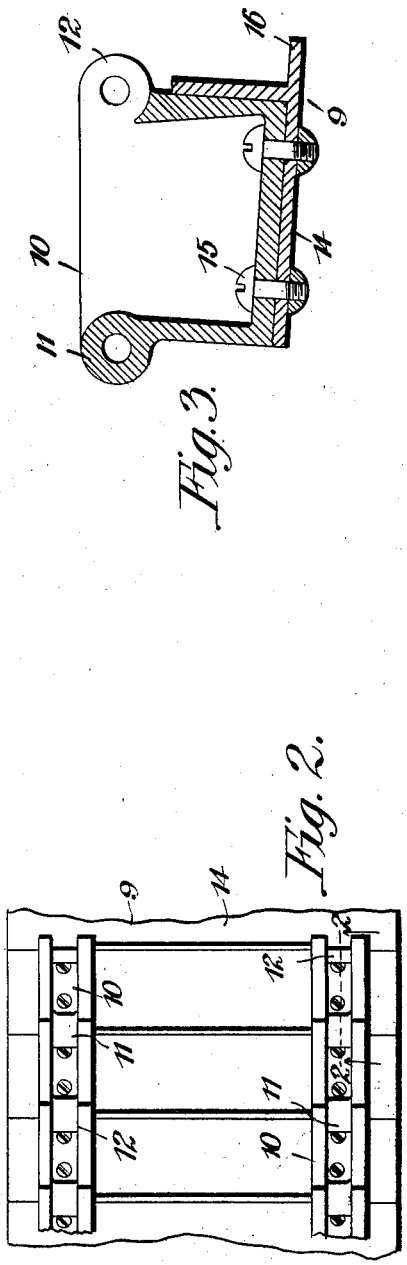

In the drawings, Figure 1 is a view in side elevation of the traction-truck. Fig. 2 is a plan view of several sections of the rolling platform, showing the manner of securing the T-shaped surface irons to the links forming the chain of the rolling platform. Fig. 3 is a longitudinal sectional elevation of one of the connecting-links, taken on the line 2 2 of Fig. 2, showing the manner of attaching the T-shaped surface irons.

Similar numerals of reference indicate corresponding parts in all the figures of the drawings.

1 designates the main frame, having journaled thereon in suitable bearings (not shown) a shaft 2, to which are keyed large platform-driving sprockets 3. The shaft 2 projects slightly beyond the end of the frame 1 and carries a sprocket-wheel 4, driven from any suitable source of power. Journaled in bearings 5 at the front and rear ends of the frame 1 are shafts 6, to which are keyed sprocket-wheels 7. The bearings 5, one of which is shown in Fig. 1, where the frame is broken away, are adjustable and secured to the frame 1 by means of bolts 8, which permits the chain to be slackened to allow its sections to be removed and repaired or replaced and also forms a tension device to take up any looseness or wear.

9 indicates the rolling platform, which consists of a plurality of chains composed of hollow links 10, each of such links being open at the top and closed at the bottom and provided with longitudinally-extending perforated lugs 11, adapted to fit corresponding sockets 12, formed in the succeeding link, to which it is connected by means of a pin or bolt 13, which holds the several links together and forms a continuous chain. Two chains are provided, one on each side of the frame 1, and connected to the links 10, comprising the chain, are treads or surface irons 14, which extend the entire width of the track and project slightly beyond the ends of the chains, as clearly shown in Fig. 2 of the drawings. The surface irons 14 are substantially T-shaped in cross-section and are secured, respectively, to the bottom of the links 11 and one side thereof by means of screws or rivets 15, which allow the surface irons to be removed when worn or broken and replaced by new ones. The ends 16 of the surface irons 14 project a short distance in advance of the links, so that when the links are connected to form a chain the ends 16 of the surface irons will underlap the rear portion of the preceding link and present a rigid and comparatively smooth surface when in contact with the ground, while the rear vertical face of each link will abut against the front face of the vertical web of the surface iron and, in connection with the pivot-pins of the links, hold the lower run of the platform perfectly rigid against upward or inward strain.

In operation power is applied through the sprocket-wheel 4 and shaft 2 to sprocket or drive wheels 3, which gear with the sprocket-chains carrying the T-shaped irons, thereby causing said chains and surface irons to revolve around sprocket-wheels 7 and 3 by sprocket-wheels 3 pulling on both the top and bottom sides of the rolling platform. By adjusting the bearings 5 of the shafts 6 the tension of the platform may be regulated to take up any looseness or wear in the chain, and the chain may be slackened to permit the removal of a broken link or surface iron and allow it to be repaired or replaced by a new one when desired.

Various changes in form, proportion, and minor details of construction may be resorted to without departing from the principle or sacrificing any of the advantages of the invention.

Having thus described the invention, what I claim is—

1. In a traction-truck, a plurality of chains formed of links having abutting ends, and surface irons overlapping each other the entire width of the truck secured to said links.

2. In a traction-truck, a plurality of chains formed of abutting links, and detachable overlapping surface irons secured to said links.

3. In a traction-truck, a plurality of chains formed of pivotally-connected links having abutting end portions, and T-shaped surface irons having their vertical or inner webs secured to the ends of the links.

4. In a traction-truck, a plurality of sprocket-wheels, shafts carrying the same, sprocket-chains extending over the wheels and provided with T-shaped overlapping surface irons for contact with the ground, the weight of the truck being supported by the wheels and chains.

5. In a traction-truck, the combination with a frame, of a revolving platform mounted thereon and comprising a plurality of links pivoted together to form a continuous chain, and overlapping surface irons secured to said links, the front end of the surface iron on one link extending entirely across and overlapping the rear end of the surface iron on the preceding link.

6. In a traction-truck, the combination with a frame, of a platform mounted thereon and comprising a plurality of links pivoted together to form a plurality of continuous chains, overlapping surface irons detachably secured to said links and extending the entire width of the truck.

7. In a traction-truck, the combination with a frame, of a plurality of sprocket-chains, sprocket-wheels gearing with and driving said sprocket-chains, the links of said sprocket-chain being provided with overlapping T-shaped surface irons forming a rolling platform the full width of the truck.

8. In a traction-truck, the combination with a frame, of shafts adjustably journaled therein, sprocket-wheels on the shafts, a power-wheel mounted on the center shaft, a traction-belt comprising a plurality of sprocket-chains, and overlapping T-shaped surface irons bolted to the links, substantially as described.

9. In a traction-truck, the combination with a frame, of a revolving platform mounted thereon and consisting of a plurality of links pivoted together to form a continuous chain, overlapping T-shaped surface irons secured to said links, and means for adjusting the tension of the chain.

10. In a traction-truck, the combination with a frame, of a revolving platform consisting of a plurality of overlapping links pivoted together to form a chain, and overlapping each other the entire width of the truck, shafts journaled in the frame, sprocket-wheels on the shafts, means for communicating power to the central shaft, and shafts adjustably mounted near the ends of the frame to regulate the tension of the revolving platform.

11. In a traction-truck, the combination with a frame, of shafts journaled in the frame, sprocket-wheels on the shafts, means for communicating power to the central shaft, a revolving platform mounted on the frame and comprising a plurality of hollow links closed at their base, and T-shaped surface irons secured to said links and having their ends projecting beyond the ends of the links to form overlapping joints.

HENRY H. SCHENK.

Witnesses:
 GEO. H. SALING,
 JOE J. ZUMSTEG.